United States Patent
Tchang Cervin et al.

(10) Patent No.: US 9,556,325 B2
(45) Date of Patent: Jan. 31, 2017

(54) NFC STABILIZED FOAM

(71) Applicant: Cellutech AB, Stockholm (SE)

(72) Inventors: Nicholas Tchang Cervin, Stockholm (SE); Lennart Bergström, Stockholm (SE); Lars-Erik Wågberg, Stockholm (SE)

(73) Assignee: Cellutech AB, Stockholm (SE)

( * ) Notice: Subject to any disclaimer, the term of this patent is extended or adjusted under 35 U.S.C. 154(b) by 0 days.

(21) Appl. No.: 14/413,579

(22) PCT Filed: Jul. 10, 2013

(86) PCT No.: PCT/SE2013/050889
§ 371 (c)(1),
(2) Date: Jan. 8, 2015

(87) PCT Pub. No.: WO2014/011112
PCT Pub. Date: Jan. 16, 2014

(65) Prior Publication Data
US 2015/0158995 A1    Jun. 11, 2015

Related U.S. Application Data

(60) Provisional application No. 61/670,046, filed on Jul. 10, 2012.

(30) Foreign Application Priority Data

Jul. 12, 2012  (SE) ..................................... 1250822

(51) Int. Cl.
C08K 5/19 (2006.01)
C08B 15/06 (2006.01)
(Continued)

(52) U.S. Cl.
CPC ................ C08K 5/19 (2013.01); C08B 11/12 (2013.01); C08B 11/20 (2013.01); C08B 15/06 (2013.01);
(Continued)

(58) Field of Classification Search
None
See application file for complete search history.

(56) References Cited

U.S. PATENT DOCUMENTS 3,311,115 A    3/1967 Mueller et al.
5,795,522 A *  8/1998 Firgo et al. ................... 264/187
(Continued)

FOREIGN PATENT DOCUMENTS

AT    WO2009/126980    * 10/2009
DE    EP2062922        *  5/2009
(Continued)

OTHER PUBLICATIONS

"Long and Entangled Native Cellulose I Nanofibers Allowflexible Aerogels and Heirarchically Porous Templates for Functiuonalities". Marjo Paakko et al. Jul. 31, 2008.*
Alargova et al., "Foam Superstabilization by Polymer Microrods," Langmuir (2004) 20:10371-10374.
Cervin, "Porous Cellulose Materials from Nano Fibrillated Cellulose," Licentiate Thesis, KTH Royal Institute of Technology, Stockholm, Sweden, Nov. 30, 2012, Trita—CHE—Report, 26 pages.
(Continued)

*Primary Examiner* — Colette Nguyen
(74) *Attorney, Agent, or Firm* — Morrison & Foerster LLP

(57) ABSTRACT

A hydrophobized nanofibrillated cellulose foam comprising a charged hydrophobic amine, a method for providing such foam and its use.

13 Claims, 7 Drawing Sheets

(51) Int. Cl.
  *C08J 9/28* (2006.01)
  *D21H 11/18* (2006.01)
  *D21H 11/20* (2006.01)
  *D21H 27/10* (2006.01)
  *D21H 21/56* (2006.01)
  *C08B 11/12* (2006.01)
  *C08B 11/20* (2006.01)
  *C08L 1/28* (2006.01)
  *C08J 9/00* (2006.01)
  *C08K 5/17* (2006.01)
  *B82Y 30/00* (2011.01)

(52) U.S. Cl.
  CPC ............. *C08J 9/0028* (2013.01); *C08J 9/28* (2013.01); *C08K 5/17* (2013.01); *C08L 1/286* (2013.01); *C08L 1/288* (2013.01); *D21H 11/18* (2013.01); *D21H 11/20* (2013.01); *D21H 21/56* (2013.01); *D21H 27/10* (2013.01); *B82Y 30/00* (2013.01); *C08J 2201/0482* (2013.01); *C08J 2301/00* (2013.01); *C08L 2205/16* (2013.01)

(56) References Cited

U.S. PATENT DOCUMENTS

| 6,967,027 B1 | 11/2005 | Heux et al. |
| 2010/0065236 A1 | 3/2010 | Henriksson et al. |

FOREIGN PATENT DOCUMENTS

| EP | 1 960 097 | 7/2012 |
| FR | 2794762 | 12/2000 |
| WO | WO-2010/071584 | 6/2010 |
| WO | WO-2010/134868 | 11/2010 |
| WO | WO-2010/142850 | 12/2010 |

OTHER PUBLICATIONS

Henriksson et al., "An environmentally friendly method for enzyme-assisted preparation of microfibrillated cellulose (MFC) nanofibers," European Polymer Journal (2007) 43:3434-3441.
International Search Report for PCT/SE2013/050889, mailed Oct. 14, 2013, 5 pages.
Jin et al., "Superhydrophobic and Superoleophobic Nanocellulose Aerogel Membranes as Bioinspired Cargo Carriers on Water and Oil," Langmuir (2011) 27(5):1930-1934.
Pääkkö et al., "Long and entangled native cellulose I nanofibers allow flexible aerogels and hierarchically porous templates for functionalities," Soft Matter (2008) 4:2492-2499.
Saito et al., "Homogeneous Suspensions of Individualized Microfibrils from TEMPO-Catalyzed Oxidation of Native Cellolose," Biomacromolecules (2006) 7(6):1687-1691.
Studart et al., "Processing Routes to Macroporous Ceramics: A Review," J. Am. Ceram. Soc. (2006) 89(6):1771-1789.
Cervin et al., "Lightweight and strong cellulose materials made from aqueous foams stabilized by nanofibrillated cellulose," Biomacromolecules (2013) 14:503-511.
Chen et al., "In-situ growth of silica nanoparticles on cellulose and application of hierarchical structure in biomimetic hydrophobicity," Cellulose (2010) 17:1103-1113.
Eita et al., "Addition of silica nanoparticles to tailor the mechanical properties of nanofibrillated cellulose thin films," Journal of Colloid and Interface Science (2011) 363:566-572.
First Office Action for Chinese Application 201380037253, issued Dec. 21, 2015, 7 pages.
Gebald et al., "Amine-based nanofibrillated cellulose as adsorbent for CO2 capture from air," Environ Sci Technol (2011) 45:9101-9108.
Supplemental European Search Report for EP 13816642.6, mailed Feb. 9, 2016, 10 pages.

\* cited by examiner a)

b)

NFC STABILIZED FOAM

CROSS REFERENCE TO RELATED APPLICATIONS

This is a U.S. National Phase patent application of PCT/SE2013/050889, filed on Jul. 10, 2013, which claims priority to U.S. Provisional Patent Application No. 61/670,046, filed on Jul. 10, 2012, and SE Patent Application No. 1250822-2, filed Jul. 12, 2012, each of which is hereby incorporated by reference in the present disclosure in its entirety.

TECHNICAL FIELD

The present invention belongs to the field of wet and dry porous materials, such as wet and dry foams, stabilized by modified cellulosic nanofibrils.

BACKGROUND TO THE INVENTION

In our everyday life, macroporous and microporous materials mostly made of petroleum based polymers are used in various forms and compositions. Examples of these are insulation in buildings and airplanes, and polymeric foams for packaging. Foams for this type of use have to be stable, light and easy to manufacture.

Due to the increased awareness of the need to use renewable materials, it is highly motivated to replace petroleum based polymers with polymers from renewable resources. Cellulose has a special potential, as the most abundant renewable natural polymers on earth with its crystalline structure and the availability of methods for preparing large volumes on an industrial scale. Cellulose chains with β-(1-4)-D-glucopyranose repeating units are packed into long nanofibrils in the plant, with cross-sectional dimension of 5-30 nm depending on the plant source. The parallel organization of the cellulose chains, held together by hydrogen bonds and organized in sheets, gives a crystal structure with a Young's modulus of approximately 130 GPa. These crystal domains are the reason why native cellulose I has such a high modulus and strength and it is interesting to consider these nanofibrils as being part of replacement material for petroleum based structures. Nanofibrils from cellulose have opened a new field as construction units for nanoscale materials engineering.

For more than a century, colloidal particles have been used to stabilize high energy interfaces in so-called Pickering emulsions. But it is only recently that this concept has been exploited for the preparation of ultra-stable wet foams and the preservation of these structures in a dry state to maintain porous materials. When particles are partially lyophobic or hydrophobic, they attach to the gas-liquid interface. It occurs because it is energetically favorable for particles to attach at the gas-liquid interface and replace part of the high energy solid-liquid area by a low energy solid-gas area. Preferably the particles should attach to the interface with a contact angle of approximately 90°. This is ultimately determined by the balance between the gas-liquid, gas-solid and solid-liquid interfacial tensions. In contrast to surfactants, particles tend to adsorb strongly at interfaces due to the high adsorption energy. This is the reason why particle-stabilized foams exhibits an outstanding stability compared to surfactant-based systems. Coalescence is hindered by the steric repulsion from the attached particles and additionally, the particles form a layer at the interface that strongly resists the shrinkage and expansion of bubbles, minimizing Ostwald ripening and creating long lasting stable foams. This further discussed in Studart, Gonzenbach, Tervoort and Gauckler, J. Am. Ceram. Soc., 2006, 89, 1771-1789.

U.S. Pat. No. 3,311,115 discloses a cigarette filter made of a dry porous cellulose, with the density of approximately 0.0008 g/cm$^3$ (should be about 0.05 US pound/foot$^3$). EP1960097B1 disclose methods on how to form stable foams from particles, but nothing is taught how to make foam from cellulose nanofibrils.

In this respect, modified cellulose nanofibrils are highly interesting for preparing highly porous renewable materials. However, cracks are usually formed in the material when wet foams are dried by freeze-drying. Thus there is a need for improved methods where wet foams can be dried so that the porous structure is maintained in the dry state.

It is also a need for foams based on a renewable material, such as cellulose.

SUMMARY OF THE INVENTION

The objective of this invention is to provide stable wet and dry foams from renewable materials.

It is further an object of the invention to provide a stable renewable material that has a high porosity and good pore size distribution, a prerequisite for good insulation properties.

One aspect of the present invention is a hydrophobized nanofibrillated cellulose (NFC) foam comprising a charged hydrophobic amine.

Another aspect of the invention is a method for producing hydrophobized nanofibrillated cellulose foam comprising:
  a) providing a water dispersion of NFC nanofibrils,
  b) calculating the charge density of said nanofibrils,
  c) reacting said NFC nanofibrils with a hydrophobic amine,
  d) foaming by introducing a gas into said water dispersion and,
  e) drying the foam from step d), without using freeze-drying;

A further aspect of the present invention is the use of a hydrophobized nanofibrillated cellulose foam comprising a charged hydrophobic amine for insulation and or packaging material.

DETAILED DESCRIPTION OF THE INVENTION

Figure 1:
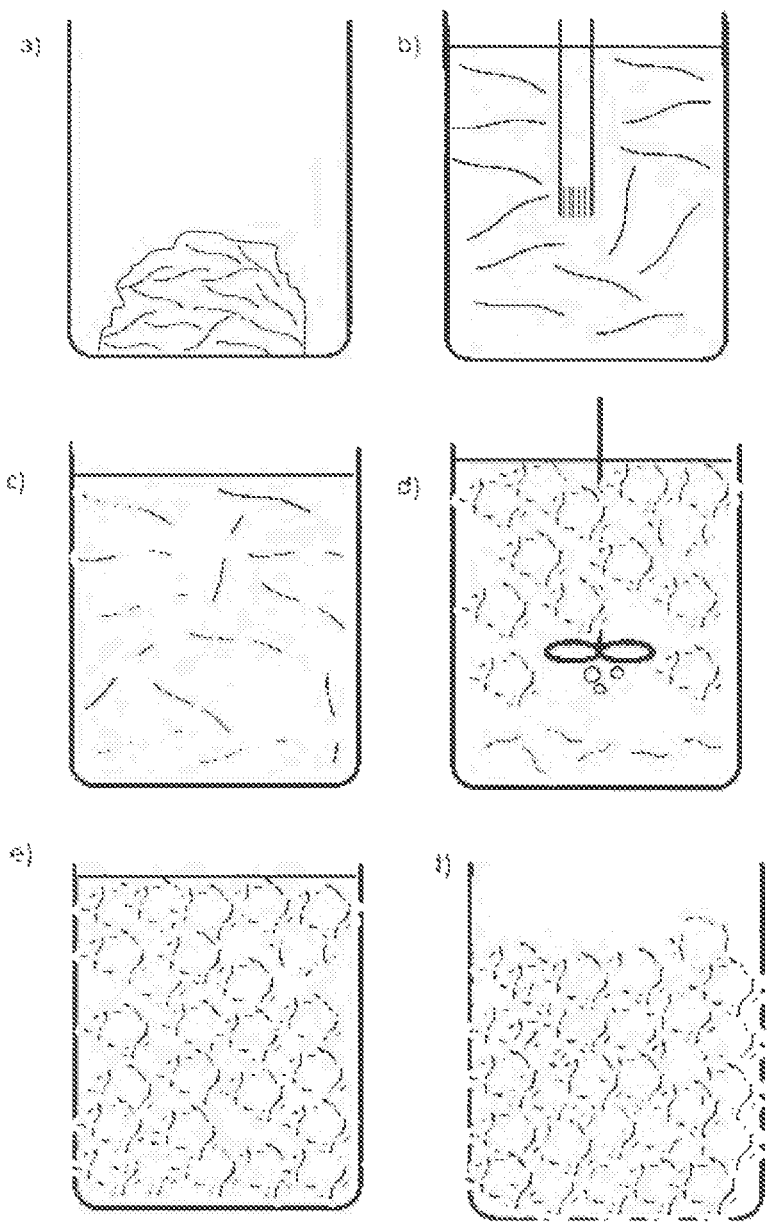
FIG. 1 shows a schematic description of the different steps for the preparation of NFC-stabilized foams.

The hydrophobized nanofibrillated cellulose foam comprising a hydrophobic amine according to the present invention may be characterized in having
i) a density below 0.10 g/cm$^3$;
ii) a porosity of at least 95%; and
iii) a Young's modulus in compression of at least 400 kPa.

The hydrophobized nanofibrillated cellulose foam comprising a hydrophobic amine according to the present invention have a density below 0.10 g/cm$^3$, such as below 0.08 g/cm$^3$; or below 0.06 g/cm$^3$; or below 0.05 g/cm$^3$; or below 0.04 g/cm$^3$; or below 0.03 g/cm$^3$.

The hydrophobized nanofibrillated cellulose foam according to the present invention may have a porosity ranging from at least 95% to at most 99%.

The Young's modulus in compression for the hydrophobized nanofibrillated cellulose foam according to the present invention may range from at least 400 kPa up to and including 500 kPa.

The hydrophobized nanofibrillated cellulose foam according to the present invention may also be characterized by having a limited passage of gases or liquids. More specifically, the hydrophobized nanofibrillated cellulose foam according to the present invention may act as a barrier to gases or liquids.

At least 50% of the pores of the hydrophobized nanofibrillated cellulose foam according to the present invention are in the range from 300 to 500 μm. Preferably, at least 70% of the pores are in the range from 300 to 500 μm.

The hydrophobized nanofibrillated cellulose foam according to the present invention does not comprise silica.

The above features of the hydrophobized nanofibrillated cellulose foam according to the present invention could be used and combined in any suitable way.

The NFC nanofibrils used in step a) of the method of the present invention may be prepared from carboxymethylated cellulose fibers, or from fibers subjected to any other type of pretreatment such as enzyme-treated fibers (Henriksson M., Henriksson G., Berglund L. A. and Lindstrom T., European Polymer Journal 43 (2007) 3434-3441) or TEMPO-oxidized fibers (Saito T, Nishiyama T, Putaux J L, Vignon M and Isogai A. Biomacromolecules 7 (2006) 1687-1691).

The NFC nanofibrils in water dispersion step a) of the method may be homogenized. The homogenization may be performed with a high-pressure homogenization technique. Further, the NFC fibrils used in step a) may have a numerical average length below 10 μm and a width from at least 5 up to at most 20 nm.

The NFC nanofibrils used in the method according to the present invention may be negatively charged. The charge density calculated in step b) may be calculated by conductometric titration.

The hydrophobic amine used in step c) of the method is positively charged. The hydrophobic amine has a charge that is opposite to the charge of the NFC nanofibrils.

The hydrophobic amine used in step c) of the method according to the present invention can be primary, secondary, tertiary or quaternary amines having the formula R$_1$NH$_2$, R$_1$R$_2$NH, R$_1$R$_2$R$_3$N or R$_1$R$_2$R$_3$R$_4$N+, wherein R$_1$ R$_2$ R$_3$ and R$_4$ represents alkyl groups and aromatic groups. The alkyl groups may be chosen from alkyl groups with 1, 2, 3, 4, 5, 6, 7, 8, 9, 10, 11, 12, 13, 14, 15, 16, 17, 18, 19, 20, 21, 22, 23, 24, 25, 26, 27, 28, 29 and 30 carbon atoms. The alkyl groups may be straight, branched or cyclic, and they may be saturated or unsaturated such as alkenes and alkynes e.g. with the above stated number of carbon atoms.

Examples of primary amines are methylamine, ethylamine, propylamine, butylamine, pentylamine, hexylamine, heptylamine, octylamine, decylamine, dodecylamine, and so on with longer alkyl chains.

Examples of secondary amines are dimethylamine, diethylamine, dipropylamine, dibutylamine, dipentylamine, dihexylamine, diheptylamine, dioctylamine, didecylamine, didodecylamine, and so on with longer alkyl chains. For all these examples R$_1$=R$_2$ but of course secondary amines where R$_1$≠R$_2$ can also be used such as N-methyl-N-octylamine.

Examples of tertiary amines are trimethylamine, triethylamine, tripropylamine, tributylamine, tripentylamine, trihexylamine, triheptylamine, trioctylamine, tridecylamine, tridodecylamine and so on with longer alkyl chains. Also tertiary amines where one of R$_1$ and R$_2$ and R$_3$ is different from the other two or where all three of R$_1$ and R$_2$ and R$_3$ are different from each other can also be used, such as N,N-dimethyloctylamine.

Examples of quaternary amines are tetramethylammonium chloride/bromide/fluoride, tetraethylammonium chloride/bromide/fluoride, tetrapropylammonium chloride/bromide/fluoride, tetra butylammonium chloride/bromide/fluoride, tetra pentylammonium chloride/bromide/fluoride, tetra hexylammonium chloride/bromide/fluoride, tetra heptylammonium chloride/bromide/fluoride, tetraoctylammonium chloride/bromide/fluoride, tetradecylammonium chloride/bromide/fluoride, tetradodecylammonium chloride/bromide/fluoride and so on with longer alkyl chains. For all these examples R$_1$=R$_2$=R$_3$=R$_4$ but of course quaternary amines where one of R$_1$, R$_2$, R$_3$ and R$_4$ are different from the other three, or two of R$_1$, R$_2$, R$_3$ and R$_4$ are different from the other two, or all four of R$_1$, R$_2$, R$_3$ and R$_4$ are different from each other can also be used, such as n-octyl-trimethylammonium bromide or hexadecyltriethylammonium bromide.

More specifically, the hydrophobic amines for use in step c) of the method according to the present invention may be selected from the group consisting of n-octyl-trimethylammonium bromide and octylamine. Even more specifically, the hydrophobic amine is octylamine.

The ratio of charge density of the NFC nanofibrils to the charged hydrophobic amine may be in the range from 1:1 to 10:1. More specifically, the charge ratio may be 2:1, 3:1, 4:1, 5:1, 6:1, 7:1, 8:1 or 9:1.

The foaming in step d) of the method may be performed by introducing air or an inert gas into the dispersion. The gas may be introduced into the dispersion by beating, agitation, whipping, bubbling or any other means suitable for formation of foam.

The contact angle of water on the hydrophobic NFC fibrils is larger than for non-treated NFC fibrils. The water contact angle for the hydrophobic NFC fibrils may be at least 35°, or at least 40°.

The above features of the method for producing the hydrophobized nanofibrillated cellulose foam according to the present invention could be used and combined in any suitable way.

The surface energy of the NFC has to be lowered in order for NFC to be able to attach to the air-water phase boundary. By physical adsorption of octylamine, the surface energy is reduced and the contact angle is increased from approximately 20° to 40°. Studart et al. J. Am. Ceram. Soc., 2006, 89, 1771-1789) have shown that contact angles as low as 20° could render adhesion energies in the order of $10^3$ kT (k is the Boltzmann constant and T is the temperature) in the case of 100 nm particles. The increase of the contact angle from 20° to 40° provides a reduction in surface energy which is sufficient for the NFC to attach to the air-water phase boundary.

An advantage with the method according to the present invention is that it is possible to form a dry porous foam by stabilizing air bubbles with NFC and a hydrophobic amine, such as octylamine. The hydrophobized NFC accumulate around the air bubbles. The porous structure can be maintained also when the foam has been dried.

The air bubbles covered with hydrophobized fibrils provides a highly porous material when the water is removed. The pores are spherical shaped pores. The porosity of the foam is calculated by using equation[1], where $\rho$ is the density of the hydrophobized nanofibrillated cellulose foam according to the present invention and $\rho_{cellulose}$ is the density of the NFC.

$$\phi = 1 - \frac{\rho}{\rho_{cellulose}} \qquad [1]$$

The foam stability for foams according to the present invention made of octylamine and NFC with a ratio of charge density of the NFC nanofibrils to the charged hydrophobic amine of 3:1, is better than for foams with equimolar charge ratio.

The features of the foam according to the present invention are further illustrated in the following examples.

Examples

Materials

A commercial sulfite softwood-dissolving pulp (Domsjö Dissolving Pulp; Domsjö Fabriker AB, Domsjö, Sweden) made from 60% Norwegian spruce (*Picea abies*) and 40% Scots pine (*Pinus sylvestris*), with a hemicellulose content of 4.5% and a lignin content of 0.6% was used for manufacturing Nanofibrillated cellulose (NFC) consisting of mainly cellulose I nanofibrils with cross-sectional dimensions of 5-20 nm and lengths in the micrometer regime. Polished silicon wafers were obtained from MEMC Electronic Materials SpA (Novara, Italy) and used as substrates for the preparation of model cellulose surfaces. Polyethyleneimine (PEI) ($M_w$=60 kDa, 50% aqueous solution, Acros Organics, US) was used for anchoring the NFC to the silica wafer and octylamine (99%) was purchased from Sigma Aldrich and used for modifying the surface energy of the NFC. The charge density of octylamine at pH=9 is 7.7 meq/g calculated by assuming that octylamine is fully protonated.

Preparation of NFC

The NFC was prepared at Innventia AB, Stockholm, Sweden, with the aid of a high-pressure homogenization technique using a carboxymethylation pretreatment of the fibers. The never-dried fibers were first dispersed in deionized water at 10 000 revolutions in an ordinary laboratory reslusher. The fibers were then solvent-changed to ethanol by washing the fibers in ethanol four times with intermediate filtration and impregnated for 30 min with a solution of 10 g of monochloroacetic acid in 500 ml of isopropanol. These fibers were added in portions to a solution of NaOH, methanol and isopropanol that had been heated to just below its boiling point, and the carboxymethylation reaction was allowed to continue for one hour. Following the carboxymethylation step, the fibers were filtered and washed in three steps: first with deionized water, then with acetic acid (0.1 M) and finally with deionized water again. The fibers were then impregnated with a $NaHCO_3$ solution (4 wt % solution) for 60 min in order to convert the carboxyl groups to their sodium form. Finally, the fibers were washed with deionized water and drained on a Büchner funnel. After this treatment, the fibers were passed through a high-pressure homogenizer (Microfluidizer M-110EH, Microfluidics Corp). The homogenizer was equipped with two chambers of different sizes connected in series (200 and 100 μm). Homogenization was achieved with a single pass at a fiber consistency of 2 wt % in aqueous solution and the charge density of the fibers was 647 μeq/g as determined by conductometric titration.

Cellulose Model Surfaces

Polished silicon wafers were used as substrates for preparation of the cellulose surfaces. The wafers were cleaned by rinsing with a water/ethanol/water sequence. Any contamination was removed by 3 min treatment in a plasma oven (PDC-002, Harrick Scientific Inc. US) operating at 30 W under reduced air pressure.

PEI was used as anchoring polymer to attach the cellulose to the silica wafer. The substrate was dipped into a 0.1 wt % PEI solution with a pH of 7.5 for 10 minutes and then rinsed with MilliQ-water and dried in nitrogen gas. The same substrate was then dipped into a 0.1 wt % NFC solution with a pH of 9 for 10 minutes followed by rinsing in MilliQ-water and dried in nitrogen gas. After these two steps, the substrate was dipped into octylamine with a concentration of 0.1 wt % in aqueous solution (CMC for octylamine is at 22.8 g/l) and a pH of 9, for 10 minutes and then rinsed in MilliQ-water and dried in nitrogen gas.

Contact Angle Measurement

A CAM 200 (KSV Instruments Ltd, Helsinki, Finland) contact angle goniometer was used for static contact angle measurements. The software calculates the contact angle on the basis of a numerical solution of the full Young-Laplace equation. Measurements were performed at 23° C. and 50% relative humidity with MilliQ-water. The contact angle was determined at three different positions on each sample. The values reported were taken after the contact angle had reached a stable value, typically less than 10 s after deposition of the droplet and the size of the drop was 5 μl for all the measurements.

Foaming

Two different types of foams were prepared with carboxymethylated NFC and different added amounts of octylamine. One was prepared with octylamine corresponding to one third of the anionic charges of the fibrils and the other had equimolar amounts of cationic and anionic charges. 30 ml of octylamine with either a concentration of 0.8 g/l or 2.4 g/l and pH=9, was poured into 46 grams of NFC-gel (2 wt % and pH=7) and mixed in an Ultra Turrax mixer for 10 minutes at 8000 rpm and another 10 minutes at 13500 rpm. The mixture was foamed with a stainless steel milk beater for 10 minutes and the resulting aqueous foam was poured into a Büchner funnel with a filter paper (Munktell grade 3) in order to drain the excess of water and then allowing the foam to dry in room temperature, see FIG. 1. NFC and octylamine have charge densities of 647 μeq/g at pH=7 and 7.7 meq/g at pH=9 respectively.

FIG. 1 shows a schematic description of the different steps for the preparation of NFC-stabilized foams. a) NFC-gel (2 wt % in aqueous solution). b) Octylamine was added to the NFC-gel and mixed by an Ultra Turrax mixer. c) Octylamine attaches to the fibrils due to electrostatic adsorption. d) Air bubbles are created by a beater and covered with the modified fibrils. e) Aqueous foam stabilized by cellulose fibrils. f) The wet foam is poured into a Buchner funnel to drain the bulk water and to allow the foam to dry in room temperature, see figure x.

Foams were also prepared using NFC prepared from TEMPO-oxidized fibers and octylamine. 1.5 ml of octylamine with a concentration of 20 g/L was added to 30 grams of NFC-gel (0.4 wt %) and was mixed and foamed for 5 minutes using a laboratory mechanical stirrer at 2000 rpm. The resulting aqueous foam was poured onto a filter paper and was dried in an oven at 50° C.

Foams were also prepared using NFC prepared from TEMPO-oxidized fibers and n-octyl-trimethylammonium bromide. 1.5 ml of n-octyl-trimethylammonium bromide with a concentration of 20 g/L was added to 30 grams of NFC-gel (0.4 wt %) and was mixed and foamed for 5 minutes using a laboratory mechanical stirrer at 2000 rpm. The resulting aqueous foam was poured onto a filter paper and was dried in an oven at 50'C.

Determination of Bubble Coalescence

Two solutions were prepared, one with modified fibrils (fibrils+octylamine) as described earlier (Foaming) and the other one with only octylamine, both at a concentration of 0.1 g/l. Small vessels (1.8 ml) were filled with either one or the other solution and a bubble was introduced with a glass pipette. The vessel was then put in a Test-Tube Rotator from Labinco and rotated for 10 minutes to allow for the bubble to absorb the respective stabilizing agent. Two bubbles with the same stabilizing agent were then transferred to a test tube with Milli-Q water one after the other and recorded with a high speed camera upon contact at the top of the test tube (see supporting information). The high speed camera was of model IDT N4S3, sensor: CMOS Polaris II, objective: Pentax Cosmicar 50 mm/F1.4, shutter speed: 41 µs, frame rate: 3000 fps (frames per second), illumination: IDT 7 LED 40 mm middle ring.

Confocal Microscopy

In order to visualize the location of fibrils at the air-water interphase, a series of experiments were conducted where fluorescently labeled fibrils and confocal microscopy was used. To label the fibrils 100 ml of aqueous NFC with a concentration of 1.2 g/l and a pH of 4-5 was reacted with 4.8 mg of the condensation agent 1-Ethyl-3-[3-dimethylaminopropyl]carbodiimide hydrochloride (EDC) which is water soluble and pH was adjusted to 4-5. 2 mg of 4-(N,N-Dimethylaminosulfonyl)-7-piperazino-2,1,3-benzoxadiazole (DBD-PZ) was added and the color changed to orange. It was left to stand overnight and then dialyzed. The fibrils were then used to prepare fibril stabilized foams and analyzed with confocal microscopes.

An inverted Zeiss Axiovert Observer.Z1 microscope equipped with LSM 5 Exciter scanner was used for CLSM imaging. A diode 405-25 nm laser was used together with a long-pass 420 nm filter to image the bubbles stabilized by the (DBD-PZ)-tagged cellulose. A plan-apochromat 10×/0.45 NA objective lens was used for all imaging, the pin-hole was fully opened and profiles were stored as eight- or twelve-bit line scans with a resolution of 512 pixels×512 pixels representing an area of 146.2 µm×146.2 µm.

Compression Testing

The prepared cellulose foam was cut into about 1 cm cubic geometry using a sharp blade for low-density foams. The compression test was performed with an Instron 5566 universal testing machine using Instron compression plates (T1223-1021) with a diameter of 50 mm. The testing was performed in a conditioned room at 23° C. and 50% relative humidity. A 500 N load cell was used with a compression rate of 10% of the original sample thickness per min. The final strain was chosen to 80% of the original specimen height to be able to evaluate the material behavior over a large deformation interval. Each test specimen was conditioned at 23° C. and 50% relative humidity for 24 hours before being tested according to ISO 844:2007(E). The energy absorbed by the foam was taken as the area below the stress-strain curve between 0% and 80% strain for all samples.

Automatic Pore Volume Distribution (APVD) Measurements

A TRI/Autoporosimeter version 2008-12 (TRI/Princeton, Princeton, USA) was used to measure the cumulative pore volume distribution of the foams using hexadecane as liquid. The membrane cut-off radius was 1.2 µm, which effectively limited the smallest measurable pore radius to about 5 µm. Cumulative pore volume distributions were recorded using 13 pressure points corresponding to pore radii in the range of 500 to 5 µm. The pore radii corresponding to a certain chamber gas pressure was calculated using the relation:

$$\Delta P = \frac{2\gamma\cos\theta}{r}$$

where γ is the liquid-gas surface tension of the liquid used, in this case hexadecane (27 mN/m), θ is the liquid-solid contact angle (cos θ=1, full wetting is assumed), Δp is the difference between the chamber gas pressure and atmospheric pressure and r is the pore radius. The liquid mass contained in pores above 500 µm was determined gravimetrically.

X-Ray Tomography

Microtomography was carried out using an Xradia MicroXCT-200. Scanning conditions: X-ray source: voltage 30 kV, power 6 W; number of projections 1800, exposure time 3 s/projection. The distances from detector and X-ray source were 7 mm and 30 mm respectively, the magnification was 10× and the pixel resolution 2.18 µm. An image of the foam is shown in FIG. 6b.

Foam Density and Porosity

Figure 3:
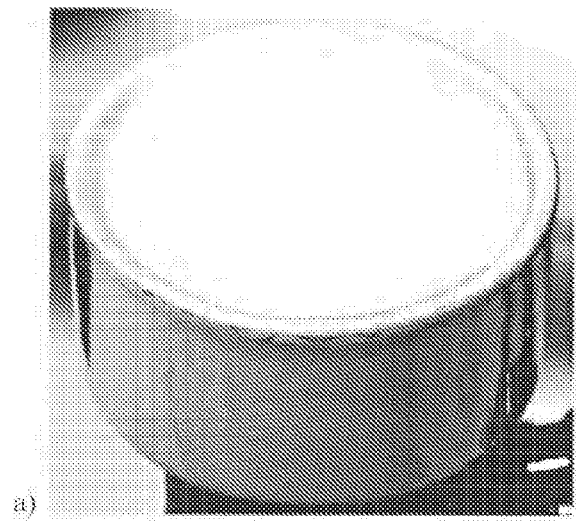
FIG. 3 shows images of NFC and octylamine stabilized foam upon drying in room temperature.
Figure 3:
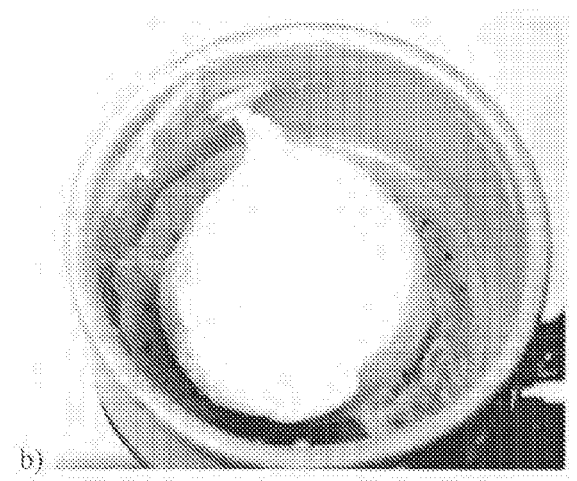
Figure 3:

Based on the foam stability results it was decided to continue the studies with the foam containing less octylamine and to investigate if it is possible to dry the foam and to achieve a dry porous structure. FIG. 3 shows that it is possible to form a dry porous foam by stabilizing air bubbles with NFC and octylamine. The volume of the aqueous foam is 85 cm³ and after drying in room temperature (23° C. and 29% relative humidity) the volume becomes approximately 20 cm³. If the NFC-gel would dry without foaming the volume would be 0.42 cm³. Hence by using the above described foaming technique, it is possible to order the fibrils in a way so that a porous structure can be maintained also in the dry state. The density of the foam is 0.03 g/cm³ and by using equation[1], where ρ is the density of the porous foam and $\rho_{cellulose}$ (1.57 g/cm³) is the density of the NFC, the porosity of the foam is calculated to be 98%.

$$\phi = 1 - \frac{\rho}{\rho_{cellulose}} \quad [1]$$

FIG. 3 shows NFC and octylamine stabilized foam upon drying in room temperature (23° C. and 29% relative humidity). a) Wet foam b) Dry foam c) Dry foam from the side.

Surface Accumulation of Fibrils

To show that there is an accumulation of NFC around the bubbles, confocal microscopy was used to study the location of the fibrils. The fluorescent fibrils are dyed green and in FIG. 4 it is shown that the fibrils are located around the air bubbles showing that the octylamine was sufficient to allow them to accumulate at the air-water interphase.

Figure 4:
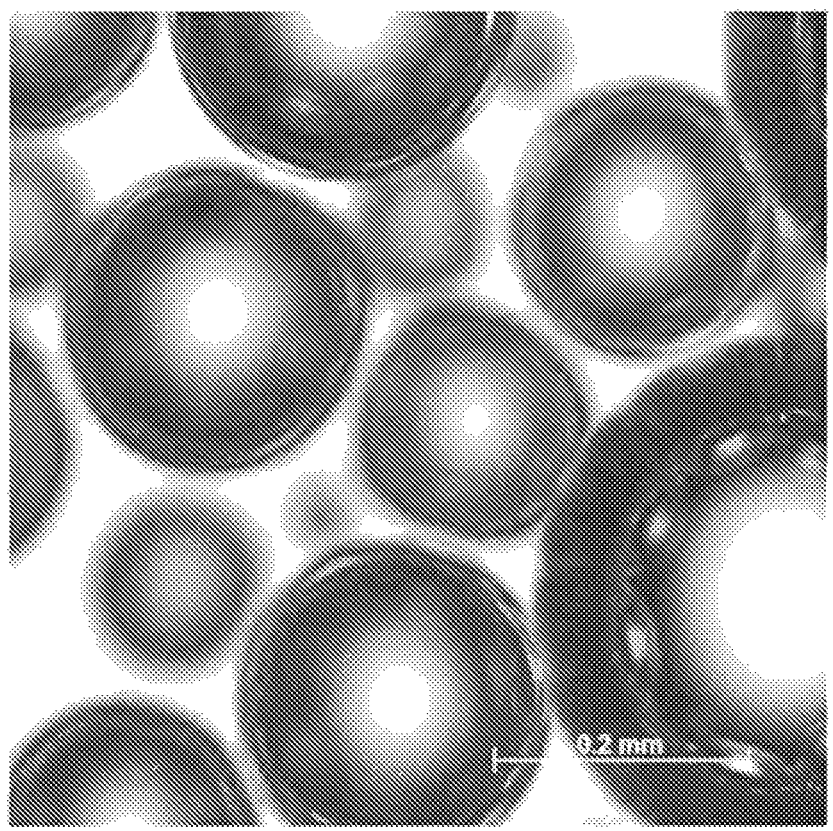
FIG. 4 shows confocal microscope showing air bubbles in water covered with fluorescently labeled cellulose fibrils that have been modified with octylamine.

FIG. 4 shows confocal microscope showing air bubbles in water covered with fluorescently labeled cellulose fibrils that have been modified with octylamine.

Figure 5:
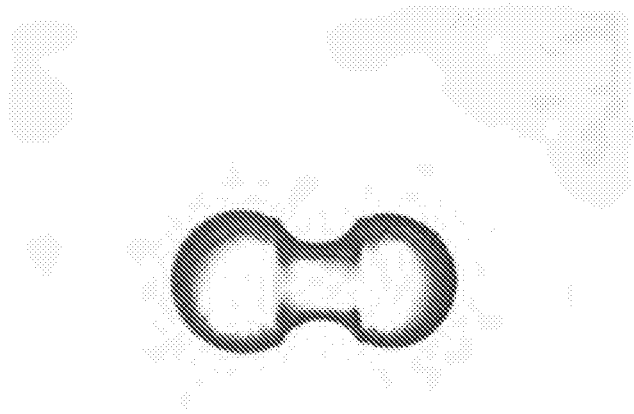
FIG. 5 shows images from high speed camera experiments, showing the interaction between two air bubbles (a) covered with cellulose nanofibrils and (b) without cellulose nanofibrils.
Figure 5:
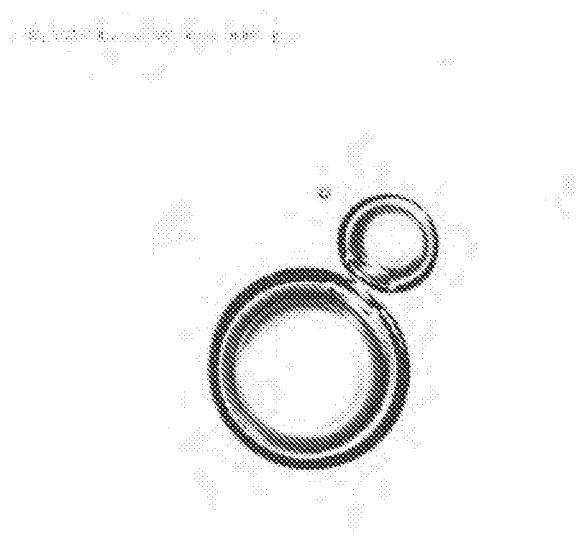

To further quantify the stabilizing action of the fibrils to prohibit the coalescence of air bubbles, the interaction between two air bubbles were investigated by using high speed imaging. In these investigations two air bubbles covered with fibrils were recorded with the high speed camera upon contact. The results, see FIG. 5, show that fibril covered air bubbles can withstand coalescence for over 10 minutes compared to uncovered air bubbles which coalesce immediately after contact. Air bubbles covered with only octylamine were stable less than 3 seconds.

FIG. 5 shows images from high speed camera experiments, showing the interaction between two air bubbles. a) Pure air bubbles with no surface coverage in MilliQ-water coalesced immediately and in b) air bubbles covered with cellulose fibrils in MilliQ-water were stable for over 10 minutes.

Porous Structure and Size in the Foam

Figure 6:
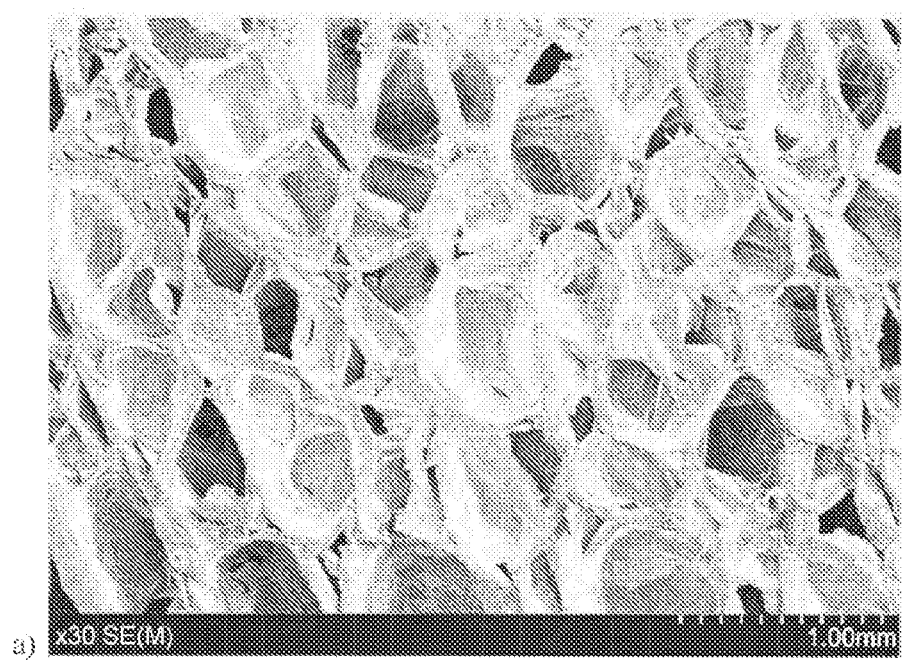
FIG. 6 shows (a) a low magnification (×30) FE-SEM image of the cross section of a dry cellulose hydrophobized nanofibrillated foam showing spherically shaped pores and (b) an X-ray tomography image of the foam.
Figure 6:
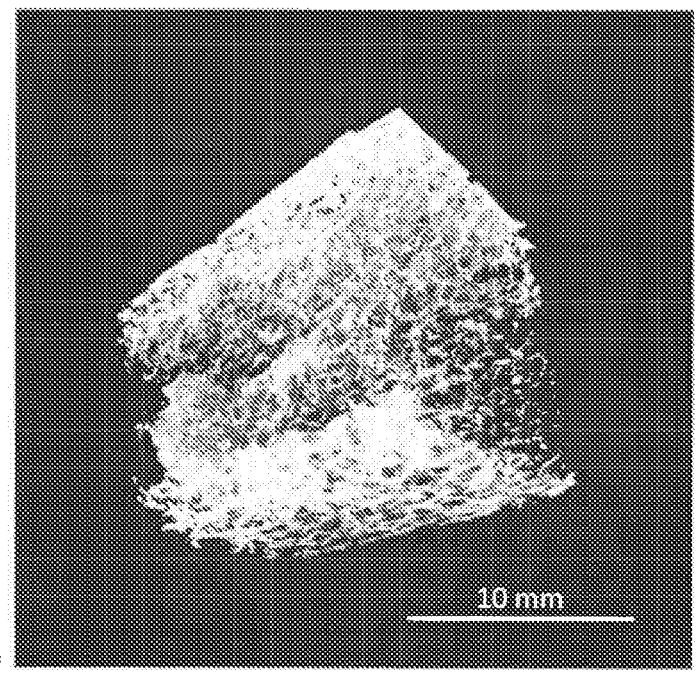

The porous structure of the dry foam, shown in FIG. 6, is created by the air bubbles which are covered with fibrils and give rise to the highly porous structure of the material when the water is removed. Since the fibrils cover the air bubbles it is reasonable to assume that this would lead to spherical shaped pores and the FE-SEM image in FIG. 6, displaying the cross section of the cellulose foam, shows that this is indeed found.

FIG. 6a) shows a low magnification (×30) FE-SEM image of the cross section of a dry cellulose foam showing spherically shaped pores. The scale bar is 1 mm. FIG. 6b) A 3-D X-ray tomography image of the dry cellulose foam (see also supporting information for a 3-D animation).

In the FE-SEM image it is obvious that the pores are rather big and up to 500 μm. This was also found in experiments with the PVD equipment (pore size distribution) showing a pore size distribution where most pores are in the range of 300 to 500 μm and very few are below 50 microns, see FIG. 7. There are approximately 3% pores that are larger than 500 μm determined gravimetrically. From the FE-SEM images it is obvious that there is a fair amount of closed pores in these foams. This means that when trying to fill hexadecane into the foams in the PVD measurements, there might be difficulties to fill all these closed pores and this could also the explanation to the low absolute volumes detected in FIG. 7. However, the distribution of pores is still considered to be accurate by comparison with the images shown in FIG. 6.

Figure 7:
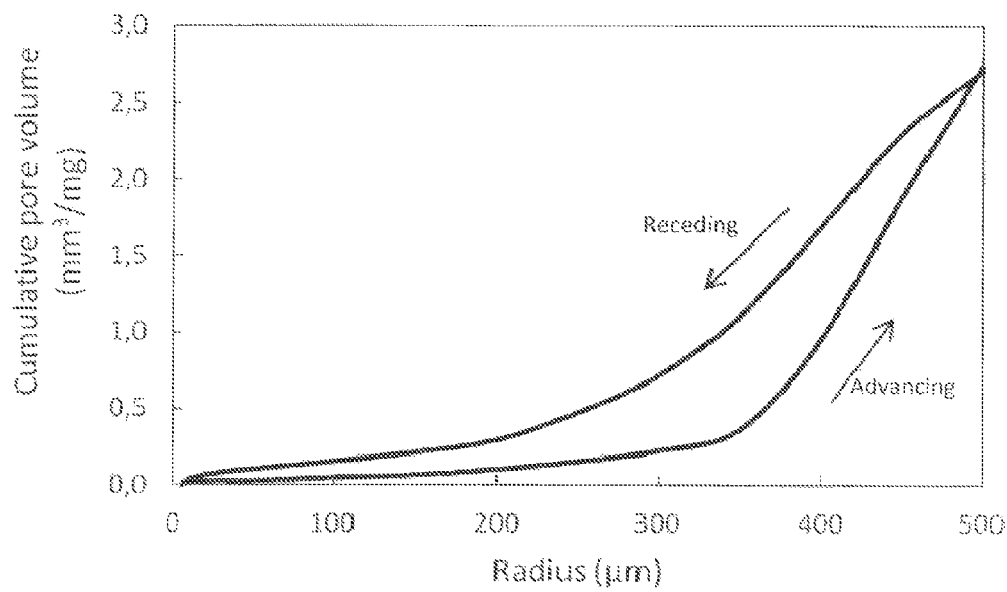
FIG. 7 shows the pore size distribution curves (advancing and receding) of a dry hydrophobized nanofibrillated cellulose foam.

FIG. 7 shows the pore size distribution curves (advancing and receding) for the cellulose foam as determined with APVD measurements using hexadecane as the test liquid to determine the "dry" structure of the foam. The curves indicate that most pores are in the interval 300 to 500 microns.

Mechanical Properties of the Foam

Figure 8:
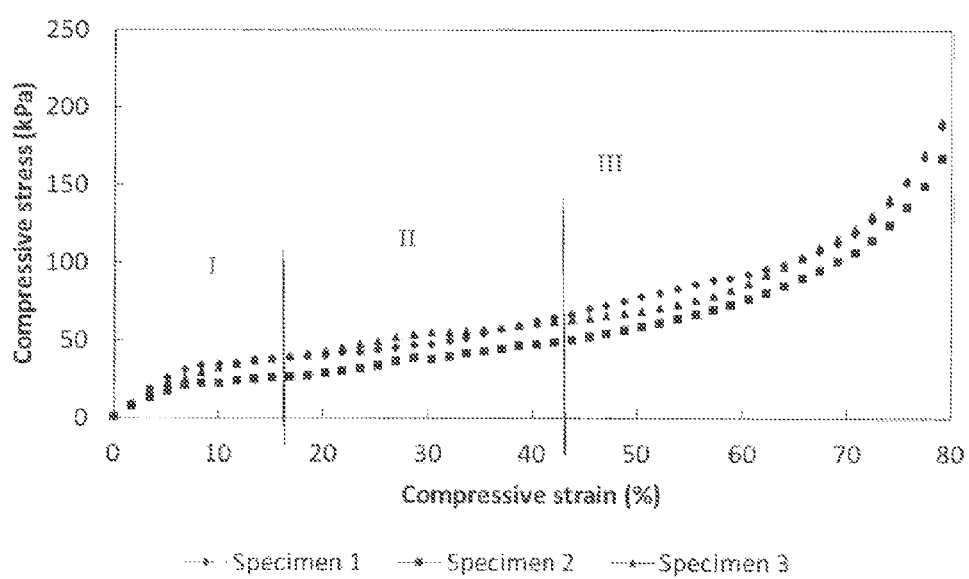
FIG. 8 shows compression stress-strain curves for a hydrophobized nanofibrillated cellulose foam.

Compression stress-strain curves for the cellulose foams are presented in FIG. 8. The three different curves indicate some variations within the foam where specimen 1 and 3 are closest the edges (see supporting information) and specimen 2 is taken between these two. The graph, in FIG. 8, is divided into three different regions; (I) linear elastic deformation at low stresses, (II) cell-collapse indicated by an approximately horizontal plateau and (III) foam densification at large strains. By using the maximum "linear" slope in region (I), it was possible to estimate the Young's modulus. A modulus of 456 kPa is higher than cellulose aerogels made from freeze drying (199 kPa) but lower than cellulose foams made from freeze drying (718 kPa) and polystyrene foam (6000 kPa). The energy absorption value for the cellulose foam is approximately 56 kJ/m$^3$ at 80% strain which is lower, but still of the same order of magnitude, as for cellulose aerogels (68 kJ/m$^3$) and for cellulose foams made from freeze drying (92 kJ/m$^3$).

FIG. 8 shows compression stress-strain curves for the cellulose foam prepared from fibril stabilized air bubbles. The graph is divided into three regions where (I) is the primary linear phase at low stresses and (II) the cell collapse and (III) the densification region. Specimens 1-3 are samples cut out from the foam where 1 and 3 are nearest the edges and specimen 2 in between as shown in the supporting information.

Foam Stability

Figure 2:
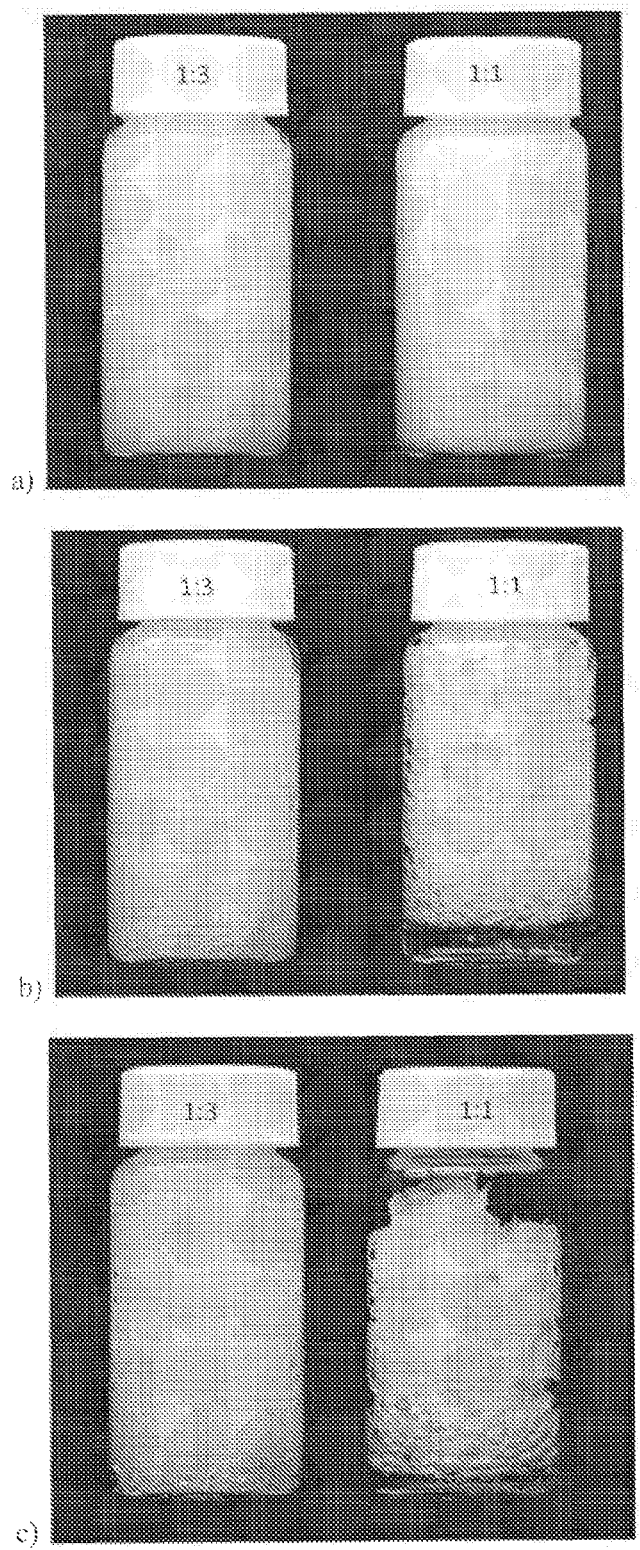
FIG. 2 shows a foam stability test of different aqueous foams with NFC and octylamine.

Foam stability test were conducted and the results are shown in FIG. 2 for foams made of NFC and octylamine with different concentration of octylamine. Foam 1:3 represents an added amount of octylamine equal one third of the NFC-charge and foam 1:1 an equimolar charge balance. There is a visible difference between the two foams after three days, where the one with less octylamine shows the best stability. Even after 10 days the foam with less octylamine is stable, while the foam with an equimolar charge balance is collapsing FIG. 2 shows aqueous foam stability test with NFC and octylamine after different times. Foam 1:3 means that the added amount of octylamine equals one third of the charge of the NFC and foam 1:1 represents an equimolar addition. a) 0 days b) 3 days and c) 10 days.

The invention claimed is:

1. A hydrophobized nanofibrillated cellulose foam comprising a charged hydrophobic amine, characterized by
   i. having a density below 0.10 g/cm$^3$;
   ii. having a porosity of at least 95%; and
   iii. having a Young's modulus in compression of at least 400 kPa;
   wherein the hydrophobic amine is of the formula $R_1NH_2$, $R_1R_2NH$, $R_1R_2R_3N$ or $R_1R_2R_3R_4N^+$,
      wherein $R_1$, $R_2$, $R_3$, and $R_4$ are each independently an alkyl group or an aromatic group, and
      wherein the alkyl groups are chosen from alkyl groups with 1-30 carbon atoms.

2. The hydrophobized nanofibrillated cellulose foam according to claim 1, characterized by having a density below 0.04 g/cm$^3$.

3. The hydrophobized nanofibrillated cellulose foam according to claim 1, characterized in that it acts as a barrier to gases or liquids.

4. The hydrophobized nanofibrillated cellulose foam according to claim 1, characterized in that it does not comprise silica.

5. The hydrophobized nanofibrillated cellulose foam according to claim 1, characterized in that at least 50% of the pores are in the range from 300 to 500 μm.

6. A method for producing hydrophobized nanofibrillated cellulose (NFC) fibrils foam according to any one of claims 1-5, comprising
   a) providing a water dispersion of NFC fibrils,
   b) calculating the charge density of said fibrils,
   c) reacting said NFC fibrils with a hydrophobic amine,
   d) foaming by beating said water dispersion and,
   e) drying the foam from step d), without using freeze-drying.

7. The method according to claim 6, wherein the NFC nanofibrils are negatively charged.

8. The method according to claim 6, wherein the hydrophobic amine is positively charged.

9. The method according to claim 6, wherein the hydrophobic amine is n-octyl-trimethylammonium bromide, or octylamine.

10. The method according to claim 6, wherein the ratio of charge density of the NFC nanofibrils to the charged hydrophobic amine is from 1:1 to 10:1.

11. The method according to claim 6, wherein the foaming in step d) of the method is performed by introducing air or an inert gas into the dispersion.

12. The method according to claim 11, wherein the air or inert gas is introduced into the dispersion by beating, agitation, whipping or bubbling.

13. The method according to claim 6, wherein the contact angle between hydrophobic NFC fibrils and the air-water phase boundary may be at least 35°, or at least 40°.

* * * * *